United States Patent
Tellenbach

(10) Patent No.: US 6,406,570 B1
(45) Date of Patent: Jun. 18, 2002

(54) ELASTIC COMPONENT FOR A PRECISION INSTRUMENT AND PROCESS FOR ITS MANUFACTURE

(75) Inventor: Jean-Maurice Tellenbach, Hettlingen (CH)

(73) Assignee: Mettler-Toledo, GmbH, Greifensee (CH)

( * ) Notice: Subject to any disclaimer, the term of this patent is extended or adjusted under 35 U.S.C. 154(b) by 0 days.

(21) Appl. No.: 09/634,332

(22) Filed: Aug. 7, 2000

Related U.S. Application Data

(62) Division of application No. 09/277,176, filed on Mar. 26, 1999.

(30) Foreign Application Priority Data

Mar. 26, 1998 (DE) .......................................... 198 13 459

(51) Int. Cl.[7] .................................................. C21D 8/00
(52) U.S. Cl. ........................ 148/608; 148/611; 148/610
(58) Field of Search ................................ 148/608, 611, 148/624, 610

(56) References Cited

U.S. PATENT DOCUMENTS

| | | | | |
|---|---|---|---|---|
| 5,026,436 A | * | 6/1991 | Pohl | 148/543 |
| 5,308,286 A | * | 5/1994 | Uejima | 148/587 |
| 5,429,688 A | * | 7/1995 | Barbosa et al. | 148/327 |

* cited by examiner

*Primary Examiner*—Roy King
*Assistant Examiner*—Harry D. Wilkins, III
(74) *Attorney, Agent, or Firm*—Burns, Doane, Swecker & Mathis, LLP

(57) ABSTRACT

An elastic component for a precision measuring instrument is made from an austenitic metal alloy containing less than two percent ferrite, less than two percent martensite, and more than eleven percent chromium. The crystalline texture has a nano-structure with blocked dislocations. The manufacturing process includes cold hardening followed by thermal aging between 200° C. and 700° C. The benefits are low anelasticity, freedom from creep and hysteresis, resistance to corrosion, and a low magnetic permeability. Examples are load cells used in analytical, motion-guiding mechanisms, coupling elements and pivoting elements.

5 Claims, 3 Drawing Sheets

ELASTIC COMPONENT FOR A PRECISION INSTRUMENT AND PROCESS FOR ITS MANUFACTURE

This application is a divisional, of Application No. 09/277,176, filed March 26, 1999.

BACKGROUND OF THE INVENTION

1. Field of the Invention

The present invention is in the field of applications for and treatments of alloyed steel in the manufacture of instruments. It concerns an elastic component for a precision instrument, including the manufacture and use of the component.

2. State of the Art

In the manufacture of instruments, certain component elements are subject to exacting requirements with regard to their mechanical properties. Typical representative examples of such elements are the flexible guides, couplings and pivots that are used in the load cells of high-precision weighing instruments; or force/displacement transducers with their associated sensors. In force/displacement transducers, the linearity of the force/displacement relationship and the reproducibility of the mechanical properties are primary objectives. Common to all elements covered under this invention is the requirement that anelasticity, creep and mechanical hysteresis be minimized. In addition, the elements are to be corrosion-resistant and preferably non-magnetic.

Components of the aforementioned kind that are used in high-performance precision instruments, e.g., for high-performance load cells of precise balances, are made primarily of martensitic precipitation-hardened stainless steels. Normally, they are solution heat treated and aged at temperatures between 450° C. and 550° C. Commercially available types are known, e.g., under the designations 17-7PH, 17-4PH, or 13-8Mo. They are virtually free of creep but suffer from a large hysteresis: When a load is applied and then removed in short succession, there is practically no remanent deformation, but in the load/displacement diagram, the curves for increasing and decreasing loads do not coincide. With variations between batches and depending on the heat treatment, the temperature, and the in-use loads that they are subjected to, components made from this material exhibit a mechanical hysteresis of $1 \cdot 10^{-4}$ to $5 \cdot 10^{-4}$. Although this amount of hysteresis may be reduced and/or partially compensated by appropriate measures, it can never be made to disappear entirely and remains as an undesirable effect. The current state of the art offers numerous solutions to overcome this unwanted effect. The range of solutions encompasses the purely mathematical error compensation (U.S. Pat. No. 4,691,290), the compensation through the design of the fastening connection (DE-U-29612167) or through the sensor, and reaches as far as special alloys and methods for influencing the lattice structure and cell geometry to prevent Bloch wall (domain wall) friction (JP-A-59126760, DE-A-4034629). These measures are either expensive or not sufficiently reproducible, or they have a negative effect on certain elastic properties. Another possibility for achieving freedom from hysteresis lies in the application of austenitic steels. However, the available austenitic steels are optimized to be resistant to corrosion and have inadequate elastic properties; after cold work hardening they are suitable for springs, but not for transducers, due to their high proportion of creep. Newer austenitic steels are designed for higher yield stresses at high temperatures, but their creep properties, likewise, are unsatisfactory. Another problem arises from the magnetic properties of the steels. Particularly in balances, but also in other precision instruments where forces or force-related displacements are to be measured, the measurement cannot be allowed to be affected by the possible presence of a magnetic field. Therefore, as an additional requirement, the constructive elements of a precision instrument must be non-magnetic.

SUMMARY OF THE INVENTION

Thus, an object is to provide a corrosion-resistant, non-magnetic device whose deformation under an applied load is in linear proportion to the load, close to totally reversible, and free from hysteresis. The present invention solves this problem by providing an elastic component for a measuring device in which the component is subjected to mechanical stress. In exemplary embodiments, the inventive component a) comprises an austenitic metal alloy that includes interstitial atoms, contains in proportion to its total weight less than two percent ferrite, less than two percent martensite, and more than eleven percent chromium, and has a crystalline texture with a nano-structure with blocked dislocations.

b) is made by a process that uses the alloy after it has been solution heat-treated and quenched, comprising process steps of shaping the component from the metal alloy, which involves application of mechanical stress that causes cold-hardening at least in localized portions, and
thermal hardening in a temperature range from 200° C. to 700° C.

The component is of importance for applications in precision measuring instruments such as balances of high resolution. The component itself may contribute to the process of generating the measurement value as is the case in transducers, sensors or the like, where the relationship between stress and strain or between load and displacement is being used, or it may be employed in pivots, guides, couplings or the like.

Using components of this kind further presents the solution for producing a) transducers incorporating an elastic component for measuring mass, weight, force, torque, angle, or displacement, b) motion-guiding mechanisms for a precision measuring instrument incorporating an elastic component, c) coupling elements used in a precision instrument in the form of an elastic component with a portion of locally reduced thickness defining the line of force introduction, d) pivot elements used in a precision instrument in the form of an elastic component with an area of locally reduced thickness defining the pivoting axis.

The elastic component of the invention is based on a metal alloy whose structure is essentially austenitic. Alloy steel is preferred. In exemplary embodiments, the proportion of ferrite and/or martensite is limited to less than two percent, which ensures that the steel is non-magnetic, and a chromium content of more than 11 percent by weight provides the required resistance to corrosion. The crystalline texture has a nano-structure that anchors dislocations, resulting in low amounts of hysteresis, anelasticity and creep.

The special crystalline texture results from a hardening process that comprises cold hardening during the shaping of the component and aging (thermal hardening, precipitation hardening) after the component has been shaped.

The base material in the manufacture of the elastic component according to the inventive process is a stainless, austenitic metal alloy containing interstitial atoms, which has been solution heat-treated and quenched. Exemplary candidates for selection are iron or nickel alloys with a sufficiently high chromium content, and can be supplemented with other elements to increase corrosion resistance, and with a sufficiently high content of nitrogen or other suitable elements to supply the interstitial atoms. From the base material, a component is made by conventional metalworking techniques. The shaping of the component can take place in a single step or in several steps. The manufacturing process of the component comprises cold working or a mechanical surface treatment or a combination of both, at least in selected portions. This treatment increases the dislocation density in the treated areas and thus hardens the material. A subsequent so-called aging, which from here on will be referred to as thermal hardening, of the entire component at a temperature range from 200° C. to 700° C. serves to anchor the dislocations, which has a positive effect on the elastic properties.

Particularly advantageous properties are obtained locally if the shaping process results in a plastic deformation of more than ten percent to a depth of at least 50 $\mu$m. Thus, component portions of locally reduced thickness as they occur in coupling and pivot elements will attain outstanding elasticity after the subsequent thermal hardening.

Thermal hardening has a particularly beneficial effect on the elastic properties if applied for more than five hours at temperatures below 480° C., yet without extending the duration of this process step to the point where corrosion resistance is unacceptably lowered.

Further advantages result from the special embodiments of the component as will be discussed below.

The elastic components of this invention, made in accordance with the inventive process, are particularly suitable for applications in precision instruments. Thus, they can be employed in transducers that rely on the highest possible degree of linearity in the relationship between force and displacement or between stress and deformation to produce a measuring result. Or they can be applied in a motion-guiding mechanism that restrains certain degrees of freedom of movement, while leaving others totally without restraint. Or they are utilized in a precision instrument as elements with locally reduced thickness in the form of a coupling for defining the line of force introduction or in the form of a pivot element for defining the center of pivoting action. In a high-precision balance, all of these applications can occur either individually or in combination with each other.

BRIEF DESCRIPTION OF THE DRAWINGS

Other objects and advantages of the present invention will be apparent to those skilled in the art upon reading the following detailed description of preferred embodiments in conjunction with the accompanying drawings, wherein.

DETAILED DESCRIPTION OF THE PREFERRED EMBODIMENTS

Figure 1:
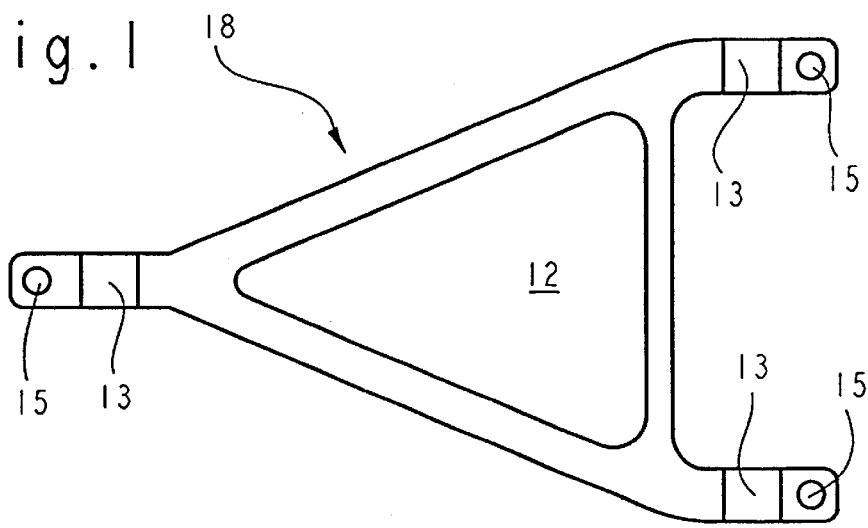
FIG. 1 shows a parallel-motion guide with flexure pivots.

Within the scope of the inventive efforts to create a corrosion-resistant, non-magnetic component which, in addition, would have the desired combination of elastic properties, consideration was given to the following factors: It is known that the mechanical hysteresis phenomenon is attributable primarily to magneto-elastic effects and to Bloch wall friction in the crystalline structure. A reduction of the hysteresis can be achieved by anchoring the Bloch walls, but this is difficult to accomplish without a worsening of the creep behavior and corrosion resistance. As a second possibility, the Bloch walls can be made to disappear by the application of a magnetic field, but this, too, is difficult and fairly expensive if high dependability is to be achieved without a marked increase of the stray field. A third possibility is to circumvent the problem by using a steel that has no unwanted Bloch walls in the first place: an austenitic stainless steel that is paramagnetic with a very small permeability, i.e., practically non-magnetic. However, the drawback of this type of steel is that it is anelastic and not resistant to creep. (Anelasticity manifests itself in that the deformation under a constant load increases with time, but disappears again within a comparable time after the load is removed. Creep, in contrast, is characterized by an irreversible, permanent deformation.) At room temperature, deformations of $5 \cdot 10^{-4}$ to $10^{-2}$ may occur within minutes. However, a low level of anelasticity and negligible creep are significant characteristics also for components other than load cells in a precision instrument, as represented for example by a high-accuracy balance.

The elastic component according to the invention is based on a corrosion-resistant austenitic metal alloy that is stable to −20° C., preferably a steel alloy, assuring a high degree of freedom from magnetism and hysteresis. The unsatisfactory properties of an elastic component which comprises this material relative to anelasticity and creep are drastically improved through a special inventive treatment. Exemplary embodiments of the elastic component consist of an austenitic metal alloy that includes interstitial atoms, contains in proportion to its total weight less than two percent ferrite, less than two percent martensite, and more than eleven percent chromium, and has a crystalline texture with a nanostructure with blocked dislocations.

An example of a suitable base material is a nitrogen alloyed, austenitic, stainless steel which is commercially available, e.g., under the designation "18—18 Plus", or in a similar composition that is optimized depending on what are the preferred characteristics for the given application. The material can be procured as profile bars, plates, sheet metal, or other shapes that appear suitable for the subsequent manufacturing process. In exemplary embodiments, the alloy has a content of 17% to 19% chromium and the same amount of manganese, 0.4% to 0.6% nitrogen, and no more than 0.15% carbon. In addition, it contains about 1% molybdenum and up to 2% copper. Optionally, further alloy components such as Nb, V, W, Ti, Ta, Zr, Al, and B can be added in a proportion of more than 0.05%, be it for the purpose of influencing the formation of precipitates or of further improving corrosion resistance.

The foregoing percentages, —as well as those that follow—are weight percentages in reference to the total weight. Austenitic alloys with different compositions of the components are also suitable, and given the present disclosure will be apparent to those skilled in the art. In exemplary embodiments, any composition which provides sufficient chromium content for corrosion resistance, manganese for the solubility of nitrogen at very high temperatures, and a combined amount of more than 0.2% nitrogen and carbon, where the part of N should be greater than of C is suitable. Also possible are nickel alloys in place of iron alloys, but they are less attractive for economic reasons. In the following, the invention is explained through the example of the steel alloy.

In exemplary embodiments, the matrix of the stainless steel, —i.e., the material of the same composition and crystalline structure that is found in the predominant part of the domains—must be entirely austenitic. To homogenize the material and to dissolve precipitates, it is advantageous to forge and hot-roll the steel at a temperature between 1050° C. and 1250° C., to solution heat treat the billet depending on its thickness for 10 to 60 minutes at 1050° C. to 1150° C., and to quench it at more than 50° C. per minute to below 500° C., thus avoiding the critical range around 700° C. to 900° C. where the material is susceptible to corrosion. This treatment removes any traces of martensite, ferrite or chromium/iron/manganese nitrides that would still be present after the cooling of the melt, yet preserves corrosion resistance.

Figure 2:
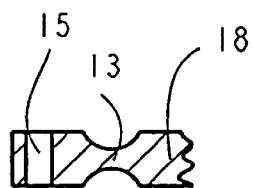
FIG. 2 shows details of the flexure pivot.

From the delivered stock material, a work piece is produced through the conventional processes of cutting, stamping, milling, turning, etc. The work piece is then subjected to a final shaping process that includes at least a mechanical surface treatment or cold forming, or both, resulting in the final shape of the component. The shaping of the component from the delivered stock material may also take place in a single step. As an example, FIG. 1 shows in plain view from above a guide 18 of a parallel-motion mechanism for the load receiver of a balance. The triangular object has a cut-out 12 and three fastening holes 15. The entire article can be stamped from sheet metal in a single process step. The stamping die can be designed in such a manner that a shaping operation at the three locations of the flexure pivots 13 takes place in the same step. In a next step, the flexure pivots are formed by rolling. The final shaping operation can be supplemented by a surface treatment such as sandblasting. FIG. 2 shows one of the reduced-thickness portions in cross-section. One recognizes the fastening hole 15 and the flexure pivot 13 with the transition to the rest of guide 18. Of course, the flexure pivots can also be made as separate components by themselves and connected in an appropriate manner to the main structure of the guide. The flexure pivots as separate components can also be employed in a different function as pivoting or coupling elements in an instrument.

Figure 3:
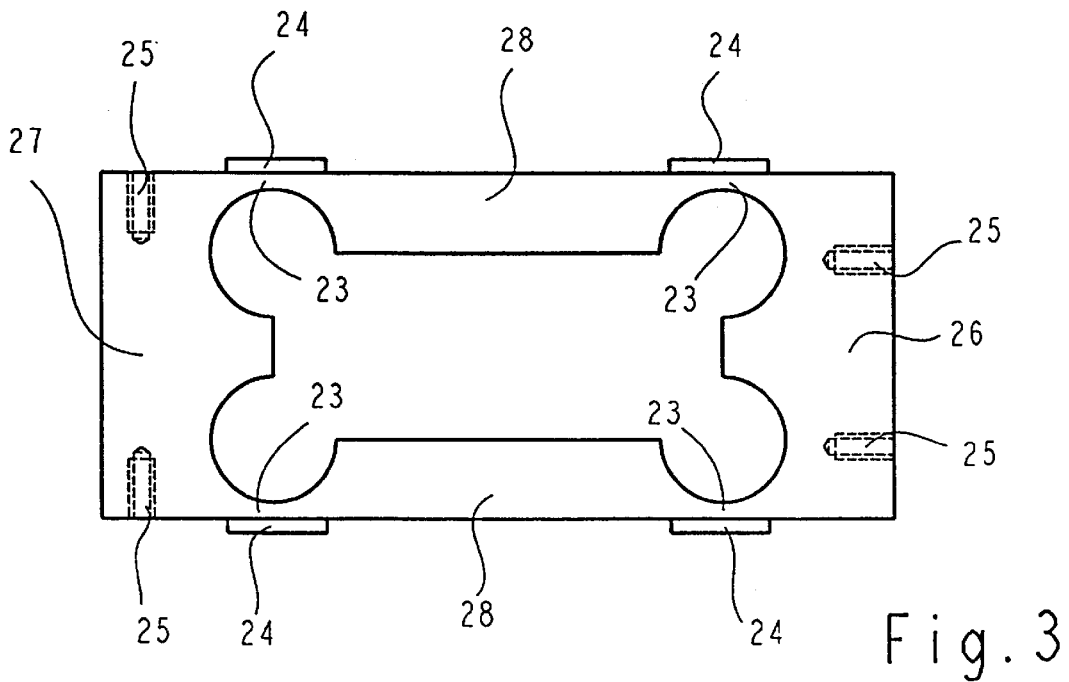
FIG. 3 shows a load cell.

The high amount of working stress to which the material is subjected, as in the forming of the pivot portions in the example above, may also occur already in making the raw work piece. An example of this is the load cell 21 shown in side view in FIG. 3. It essentially comprises the fixed portion 26 with fastener holes 25, the load-receiving portion 27, likewise with fastener holes 25, and the parallel guides 28 lying between them. The narrow connecting portions 23 in this case function simultaneously as pivots and also as springs whose deformations are registered by means of strain gauges 24. The load cell is made from bar stock of rectangular profile. First, the rough-cut work piece is stretched by 1 to 2% or more, i.e., plastically deformed, in order to remove any possible warpage. The cutout 22 which gives the part its form and function is made by drilling and/or milling. The outward-facing surfaces are also machine-finished, at least at the connecting portions 23. The machining operation causes a plastic deformation that is greatest at the surface and diminishes with increasing depth. Thus, the conditions are optimized for the elastic properties at the surface, which is where the largest stresses occur when the load cell is in use.

In exemplary embodiments, the surface machining operations cause a localized permanent deformation to a depth of at least 50 micrometers ($\mu$m) which should preferably exceed 10%. Cold forming—which includes forging, rolling, pressing, deep-drawing, bending, etc. —in most cases affects the entire cross section in the respective portion of the component. Cold hardening increases the dislocation density and thereby increases the yield stress. Therefore, cold hardening is used at least in those portions of the component that will later, in use, be subjected to the greatest stress, i.e., the portions of reduced thickness in the examples. As it increases the dislocation density, cold hardening facilitates atomic diffusion, particularly of interstitial atoms, in the course of the subsequent thermal aging.

Figure 4:
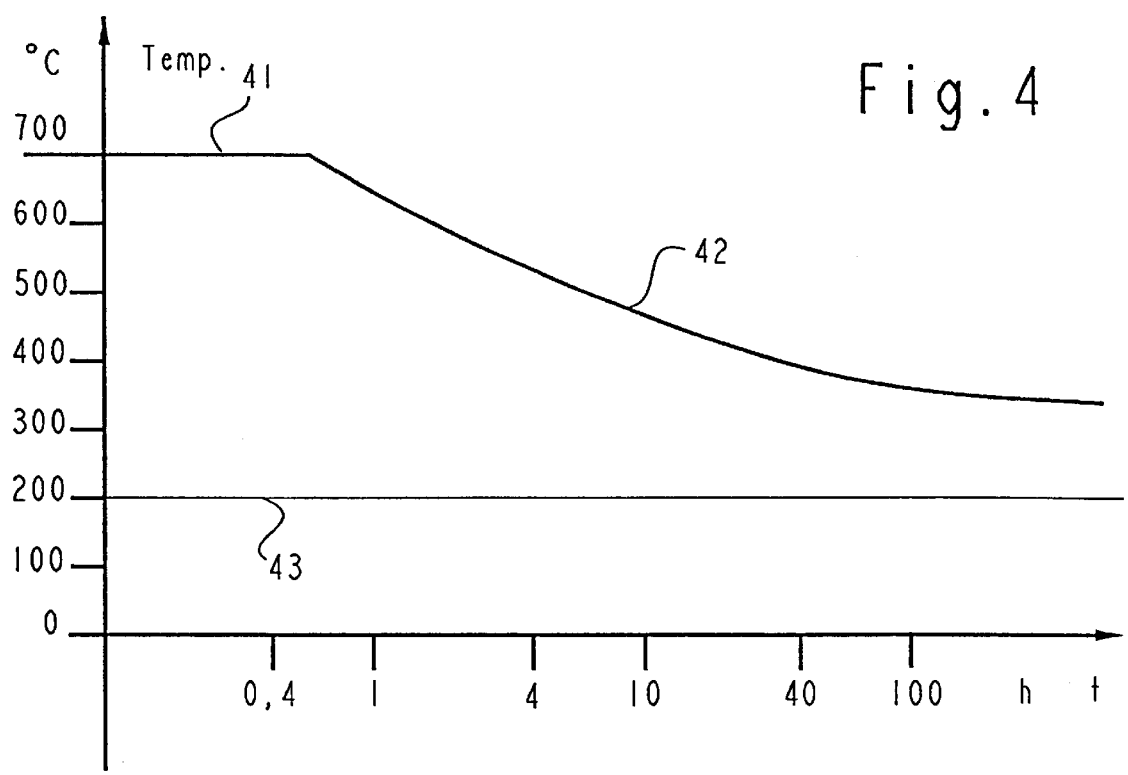
FIG. 4 shows a temperature/time diagram showing the boundaries for the thermal hardening process.

In the thermal treatment that concludes the manufacturing process, the finished component is precipitation-hardened, which improves the elastic properties, i.e., primarily reduces anelasticity and makes creep virtually disappear. However, avoiding the loss of corrosion resistance is an immediate concern. FIG. 4 shows exemplary limits for thermal hardening in a temperature vs. time diagram. The upper temperature limit 41 is at 700° C. Above this limit, coarse precipitates may form uncontrollably within a short time. At temperatures below the limit the process remains under control. In the upper part of the range, the still considerable temperature favors the formation of nitrides, and chromium diffuses more easily at this temperature level. Thus, if the duration of the treatment is too long, there is a risk that chromium will accumulate around the precipitates and the chromium content of the matrix will be depleted to less than 11% in the surrounding regions, making them susceptible to corrosion. Therefore, it is important to obey a limiting curve 42 in the shape of a reciprocal temperature vs. time curve. For treatment temperatures and durations above and to the right of the curve, corrosion resistance is no longer assured. The limiting curve 42 together with the scale values indicated along the diagram axes should be taken as a representative example rather than an absolute limit, given that its coordinate position in the diagram and, to a lesser degree, its shape depend on the material composition in each individual case. Below a certain mobility limiting curve 43 of approximately 200° C., diffusion practically ceases to occur within any useful time frame, and there are no more significant structural changes. Therefore, in exemplary embodiments, the thermal hardening process is performed in the range between 700° C. and 200° C., preferably at less than 480° C. and for more than 5 hours, to avoid the risk of large variations in chromium concentration.

It is true in all cases that within the available time/temperature range the elastic properties improve with the continuing course of the treatment until an optimum amount of time has been exceeded. The higher the treatment temperature, the shorter is the corresponding time span. Overall, treatments of longer duration at lower temperature give better results than shorter treatments at higher temperature. A heat treatment that is too long in relation to the given temperature will produce larger precipitates within the structure and thus, because of the greater distance between precipitates, result in dislocations that have greater mobility under stress, which is detrimental to the desired mechanical properties.

The following example shows what particular advantages are gained through an optimized procedure according to the inventive process. The raw material used is a standard alloy steel with the designation DIN 1.3816, i.e., an austenite with close to 20% Mn, close to 20% Cr, less than 0.12% C, and 0.4 to 0.7% N, which has been solution heat treated for 45 minutes at 1100° C. and then quenched in water. The subsequent processing of the material into a form that is suitable for storage and-delivery involves a cold working deformation of 5%, i.e., the material is permanently elongated by 5% in one direction. The subsequent milling and drilling of the work piece results in a plastic deformation of 10% to a depth of at least 50 micrometers ($\mu$m) below the surface. If a material of this kind is subjected for half an hour to a load that causes a stress of 250 MPa, one will observe an anelasticity of 450 to 1500 ppm, i.e., the strain of the material deviates up 0.15% from the linear curve. The hysteresis amounts to 1600 to 4700 ppm, i.e., when the load is stepped up in quick succession to 125 MPa, then to 250 MPa, and back to 125 MPa and 0 MPa, the two strain values at 125 MPa for increasing and decreasing load, respectively, will differ by up to 0.47%. If, on the other hand, the shaping is followed by a thermal treatment at approximately 345° C. for 20 hours, this will lead to a drastic reduction of the anelasticity to 150 to 180 ppm and of the hysteresis to 140 to 220 ppm. If the component produced in this manner is used for its intended purpose and the maximum stress is limited to 125 MPa, the anelasticity will be less than 130 ppm and the hysteresis will be less than 95 ppm.

Thus, the two steps of cold hardening and thermal hardening make it possible to produce the component with the desired special properties. In this, the last step is not customary within the state of the art because of the associated risk of a loss in corrosion resistance; but as has been shown, this risk occurs only if the steel is aged for too long, especially in the higher part of the still permissible temperature range. The risk is further reduced if there is a sufficient proportion of nitrogen in relation to carbon. It is left to professional know-how to select the appropriate cold forming process in coordination with the final heat treatment in order to optimize the result in accordance with the requirements, depending on the given alloy and the shape of the component.

The improvement of the elastic properties is the result of a nano-structure with blocked dislocations. The term nano-structure as used here goes back to the microstructure of crystalline materials which is extensively described in the literature, e.g., in Cahn R. W. and Haasen P., ed., "Physical Metallurgy", $4^{th}$ edition 1996, Elsevier Science B. V., Amsterdam, vol. 1, chapter 9, the contents of which are hereby incorporated by reference in their entirety. It is defined by the type, structure, number, shape and topographical arrangement of phases and/or lattice disturbances which, in most cases, are not part of the structure in thermodynamic equilibrium. A nano-structure is a microstructure consisting of a polycrystalline matrix and at least one kind of components that are finely distributed in the matrix. The crystals can be made visible in a polished cut through etched grain boundaries. The dimensions and average distances of the finely distributed components are in the nanometer range, i.e., they are in the range from one to a thousand nanometers. A distinction is made between the following finely distributed components: Phases of a different kind in the form of ceramic and/or intermetallic precipitates, accumulations of interstitial atoms, such as C and N, around dislocations, so-called Suzuki clouds, and zones in which the concentration of the chemical composition varies, as in liquations, spinodal separations and diffusion gradients. Dislocations, i.e., linear irregularities in the lattice, are inherent in the polycrystalline matrix. When the material is under stress, there is a tendency that dislocations in the crystalline structure are moved irreversibly. The finely distributed components block the movement of the dislocations and thereby prevent their irreversible displacement at stress levels up to at least one fourth of the yield stress, which may be in excess of 1.0 GPa (140,000 psi). In addition, if higher temperatures are used during thermal hardening, complex inter-metallic precipitates, such as the so-called Laves phases, may occur.

Figure 5:
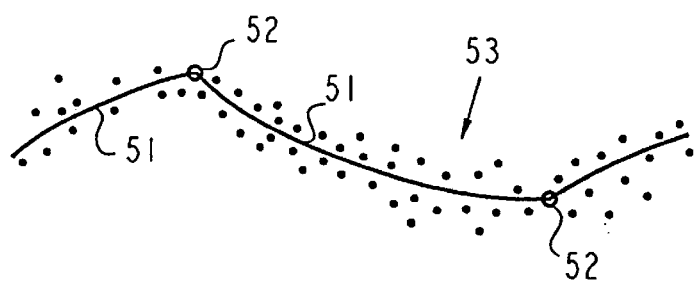
FIG. 5 shows a schematic illustration of an anchored dislocation.
Figure 6:
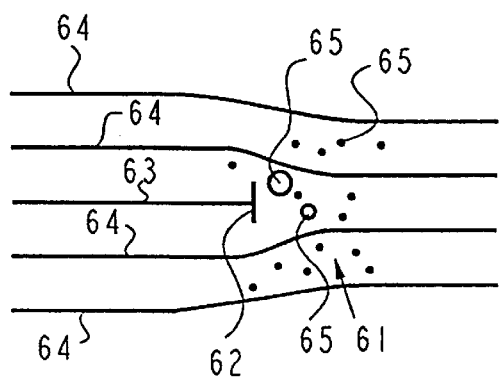
FIG. 6 shows a schematic illustration of a Suzuki cloud.

FIG. 5 schematically illustrates how the dislocations 51 that extend primarily between larger precipitates 52 or phase occlusions with a different crystalline structure are anchored by the nano-structure 53 that include composition gradients, Suzuki clouds, and/or precipitates in the nanometer range. FIG. 6 schematically shows a Suzuki cloud 61 at a dislocation 62. The atom layer 63 breaks off at this place; the other atom layers 64 conform accordingly and resume a regular pattern only at some distance from the dislocation 62. In the vicinity of the dislocation 62 with the disturbed crystal lattice, there is room for interstitial atoms. These occlusions constitute the Suzuki cloud 61.

Due to the high chromium content, a component made in accordance with the process described above is corrosion-resistant so that it will easily pass a standardized salt water spray test. This is essential and of great advantage for applications of the component in many industrial uses, particularly in the food, animal feed, chemical and pharmaceutical industries. The low ferrite/martensite content ensures that the magnetic permeability remains minimal, which is an indispensable characteristic for applications in precise force measuring instruments. The nevertheless outstanding elastic properties are an extremely small amount of anelasticity and a hardly measurable level of creep as well as virtual freedom from hysteresis.

Interstitial atoms reinforce the matrix and increase the stability of the crystalline structure. Primarily suitable as interstitial atoms are nitrogen and to a lesser degree carbon. But also, for example, boron, beryllium, and lithium may be considered, i.e., elements with atomic numbers from 3 to 7. The reinforcement becomes noticeable if the component contains at least 0.2% interstitial atoms. Preferably, a combined content of 0.4% nitrogen and carbon is used, with a predominant proportion of nitrogen. The nitrogen is one of the determinant factors for the formation of precipitates during heat treatment and provides better conditions for the formation of the nano-structure in the hardening process. A high content of manganese aids in a better binding of the relatively high proportion of nitrogen.

Additional carbide-, carbonitride-, and nitride-forming elements in amounts over 0.05% of the initial material have the effect of suppressing granular growth during the solution heat treatment, and they contribute to the formation of the nano-structure. In addition, they will increase the yield stress level and the ultimate strength. In exemplary embodiments, the carbide-forming elements niobium or vanadium, or a combination of both, are preferred, and titanium, tantalum, tungsten and zirconium can also be considered. For example, titanium will enter into the compounds TiN, TiC, $Ti_x(CN)_y$.

Manufactured components containing interstitial atoms or carbide-, carbonitride-, or nitride-forming elements individually or in combination show a corresponding crystalline structure with an optimized nano-structure, particularly including Suzuki clouds effecting a stable anchoring of the dislocations. The cold hardening and a relatively long final heat treatment at low temperature prevent the nano-structure from becoming too coarse.

A further advantage arises if the manufactured component has more than 0.2% copper content. Cu retards the formation of martensite which occurs under the high cold-working stresses that reach the level of plastic deformation. In addition, Cu decreases the solubility of nitrogen during thermal hardening, i.e., at relatively low temperatures, and thereby accelerates the precipitation of nitrides. Further, at more elevated aging temperatures, it favors the formation of complex inter-metallic and Laves phases. Moreover, it enhances corrosion resistance through passivation.

By taking the measures just described, there is almost no limit on how low the ferrite and/or martensite content—and thus the permeability—can be kept, given that austenitic steel is non-magnetic. Consequently, a manufactured component according to the invention can be produced with a relative permeability of, for example, less than 1.004 at a magnetic field strength of 80 A/cm, which is a commonly required specification for non-magnetic metallic articles.

A very strong permanent local cold-working deformation of more than 10% can have the unwanted side effect of increasing the ferrite/martensite content, and with it the permeability, in the cold-worked portions. However, with a sufficient nitrogen content, aided by a high manganese content, and some copper, the effect will be hardly noticeable. The creep properties, on the other hand, will be markedly better. Due to the strong deformation of the manufactured part up to a depth of, for example, at least 50 micrometers ($\mu$m), outstanding mechanical properties are imparted in particular to the thin portions of the component without loss of the targeted general characteristics.

Elastic components with the aforesaid distinctive properties have applications in transducers for the measurement of mass, weight, force, torque, angle, or length, i.e., wherever the linear, reproducible, hysteresis-free relationship between stress and strain in a construction element is utilized to create an analogue of the measurand quantity. In particular, this includes load cells equipped with capacitative or piezo-electric sensors, strain gauges, resonators, or similar devices. For example, accuracies of 10 ppm are achievable with stress levels exceeding 0.3 GPa (42,000 psi) at room temperature.

Figure 7:
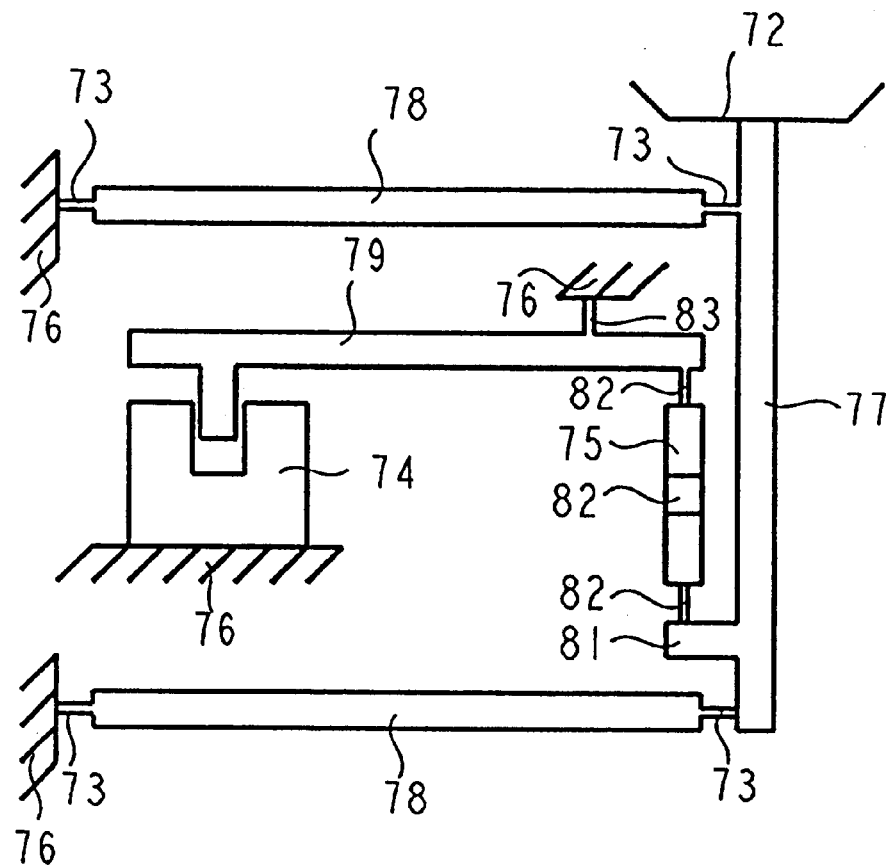
FIG. 7 shows a principal architecture of an analytical balance.

As a further exemplary application, a component according to the invention can be used in a mechanical guided-motion device in a precision measuring instrument, e.g., in the parallel-motion mechanism of an analytical balance. The elastic construction element is also particularly suitable as a coupling or pivot element in the shape of a portion of reduced thickness in a precision instrument. FIG. 7 shows the working principle of an analytical balance with electromagnetic force compensation. The balance 71 has a parallelogram linkage guiding the load receiver 72, comprising the guides 78 which are connected through flexure pivots 73 to the stationary console 76 on the one side and to the hanger 77 on the other. The flexure pivots 73 are stiff against warping or buckling, so that the hanger can move only in the vertical direction. When a weight is placed on load receiver 72, it is transmitted through the attachment projection 81 on hanger 77 through the tensile coupling 75 to the force-reduction lever 79 which, in turn, is pivotably supported on the console 76 by fulcrum 83. The tensile coupling has coupling elements 82 in the form of portions of reduced thickness which assure a one-dimensional force introduction in the vertical direction. The reduced weight force on lever 79 is compensated by an electromagnetic force compensation device 74 that is mounted on the console 76. Any or all of the balance components just described can be made with elastic elements according to the invention. Their application as individual flexure pivots 73, coupling elements 82, and fulcrum element 83 is particularly advantageous, but it is also beneficial if the entire parallel-motion linkage with guides 78, the entire coupling 87, as well as the lever 79, each by itself or in combination, are designed as one elastic component made integrally from the same material.

Due to their high corrosion resistance, the components do not require a coating or other surface treatment. The absence of a protective layer precludes possible adverse effects on the elastic properties and facilitates handling during manufacture and in use.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced therein.

What is claimed is:

1. A process for manufacturing an elastic component from a non-corroding, austenitic metal alloy containing interstitial atoms that has been solution heat treated and quenched, comprising the steps of:

shaping the component from the metal alloy, by an application of mechanical stress that increases the dislocation density and causes cold-hardening at least in localized portions; and thermal hardening the component in a temperature range from 200° C. to 700° C. long enough to cause a nano-structure with blocked dislocations as a consequence of diffusion of the interstitial atoms, and short enough to avoid coarse precipitates resulting in the loss of corrosion resistance.

2. The process according to claim 1, wherein the shaping causes a plastic deformation of at least 10% to a depth of at least 50 micrometers in the localized portions of the component.

3. The process according to claim 1, wherein the thermal hardening is performed at a temperature below 480° C. for more than 5 hours but less than a time at which a chromium content is depleted to less than 11 wt. % in a region surrounding a precipitate.

4. The process according to claim 1, wherein the metal alloy is a nitrogen-containing chromium-manganese steel, and the thermal hardening is performed at a temperature of approximately 345° C. for close to 20 hours.

5. The process according to claim 1, wherein the metal alloy has a weight proportion of more than 0.2% interstitial atoms with an atomic number between 3 and 7 in the periodic table of elements, and a combined total of more than 0.4% nitrogen and carbon, with a greater proportion of nitrogen than carbon.

* * * * *